United States Patent [19]

Léopold

[11] Patent Number: 4,784,821

[45] Date of Patent: Nov. 15, 1988

[54] METHOD FOR MANUFACTURING A BUILDING BLOCK IMITATING A PILE OF DRY STONES

[76] Inventor: Dory Léopold, 7, rue Parc An Ty - Graces, 22200 Guincamp, France

[21] Appl. No.: 65,924

[22] Filed: Jun. 24, 1987

[30] Foreign Application Priority Data

Jun. 30, 1986 [FR] France ................................ 86 09577

[51] Int. Cl.[4] ...................... B28B 11/22; B29C 43/20; B32B 31/20

[52] U.S. Cl. ...................................... 264/510; 249/99; 264/139; 264/162; 264/256; 264/504; 264/570; 264/DIG. 57; 425/357; 425/446

[58] Field of Search ............... 264/139, 570, 162, 333, 264/504, 256, 163, DIG. 57, 510; 425/446, 357; 249/15, 99

[56] References Cited

U.S. PATENT DOCUMENTS

| | | | |
|---|---|---|---|
| 756,971 | 4/1904 | Leighton | 264/DIG. 57 X |
| 772,476 | 10/1904 | Podmore | 264/DIG. 57 X |
| 1,162,172 | 11/1915 | Jones | 264/DIG. 57 X |
| 1,619,733 | 3/1927 | Jeppson | 264/162 X |
| 1,856,906 | 5/1932 | Carvel | 264/DIG. 57 X |
| 3,390,496 | 7/1968 | Weiner et al. | 264/256 X |
| 4,466,937 | 8/1984 | Johnston et al. | 264/139 X |

FOREIGN PATENT DOCUMENTS

| | | | |
|---|---|---|---|
| 0609819 | 12/1960 | Canada | 264/139 |
| 0035728 | 4/1978 | Japan | 264/504 |
| 0087108 | 5/1984 | Japan | 264/139 |
| 0131588 | 7/1984 | Japan | 264/139 |
| 2022502A | 12/1979 | United Kingdom | 264/139 |

OTHER PUBLICATIONS

The Master Builders Company, "Concrete 64", vol. 3, No. 2, pp. 12–13, Apr. 5, 1965.

*Primary Examiner*—Jan H. Silbaugh

*Assistant Examiner*—Karen D. Kutach

*Attorney, Agent, or Firm*—Mason, Kolehmainen, Rathburn & Wyss

[57] ABSTRACT

A method of manufacturing a building block which imitates a pile of dry stones. According to the method, the stones (10) are placed side-by-side on the bottom of a mold whose inside shape corresponds to the desired block shape, said bottom being constituted by a grating. Cement is then cast inside the mold. The cement (11) is compressed in order to force it to spread out uniformly inside the mold and to creep between the stones (10). While the cement is kept under pressure, water is projected through the bottom grating against the outside face of the block (1), so as to remove any cement which may be found thereon. Pressure is then removed from the cement and it is allowed to set. Finally the block (1) is extracted from the mold.

6 Claims, 2 Drawing Sheets

METHOD FOR MANUFACTURING A BUILDING BLOCK IMITATING A PILE OF DRY STONES

The present invention relates to a method of manufacturing a building block which imitates a pile of dry stones, and also to an installation enabling the method to be implemented.

BACKGROUND OF THE INVENTION

The present Applicant's prior French patent FR No. 2 545 129 describes a prefabricated block of the type mentioned which is constituted by a slab of cement (or of any other similar hardenable binder), with one of its faces being lined with visible juxtaposed stones which are held fast by the cement. Two opposite edges of the slab are in the form of irregular lines (e.g. zig-zag lines) suitable for mutual interfitting. This arrangement serves to mask the joints between two adjacent blocks when assembled together, in particular when erecting a wall or laying a paving, and the assembly obtained in this way imitates a continuous pile of dry stones.

At present, in order to manufacture an block of this nature, the Applicant begins by placing the stones, e.g. rejects from granite cutting, side-by-side on the bottom of a mold having an open top and having sides which are identical in shape with the shape of the block to be manufactured. A metal frame may optionally be placed over the layer of stones in order to improve the mechanical strength of the finished block and then fluid cement is cast into the mold. Once the cement has set, the finished block is removed from the mold.

Experience has shown that this traditional method used by the Applicant does not give full satisfaction since the cement does not always completely and fully fill the mold, thereby giving rise to voids which are unacceptable on grounds of the block's appearance or its mechanical strength, and which sometimes give rise to the stones being poorly retained by the cement. In addition, the cast cement frequently reaches the visible portions of the stones and sets on said portions, thereby spoiling the appearance of the finished article.

The invention seeks to mitigate these problems by proposing a manufacturing method of the type mentioned which is easy and cheap to implement, which enables very high quality finished blocks to be obtained with a low reject rate, and which is suitable for medium to large scale production.

SUMMARY OF THE INVENTION

These results are achieved by performing the following operations:

(a) the stones are placed side-by-side on the bottom of a mold whose inside shape corresponds to the shape of the block, said bottom being constituted by a grating;

(b) the mold is filled with fluid cement;

(c) the cement is compressed to force it to spread uniformly inside the mold and to infiltrate between the stones;

(d) while keeping the cement compressed, water is projected through the grating bottom onto the outside face of the block so as to remove the cement therefrom;

(e) the pressure is taken off the cement and it is allowed to set; and (f) the block is removed from the mold.

The mesh size of the grating constituting the bottom of the mold is naturally chosen as a function of the average size of the stones used, so that the smallest stones used do not pass through the holes through the grating, while nevertheless leaving holes which are large enough to avoid hindering the passage of the jets of water used for removing unwanted cement.

If reinforced blocks are required, in particular for withstanding traction forces, it may be advantageous to place a metal reinforcing member (e.g. a trellis or a grating) inside the mold prior to casting the cement.

Also, in order to improve the appearance of the finished block and the quality of stone retention by the cement, it is preferable, prior to casting the cement, to wash the stones placed in the mold and then to project an additive onto the stones for encouraging binding with the cement.

The cement may be compressed in the mold very simply by means of a moving pressure plate extending parallel to the bottom of the mold in the form of a grating, said plate constituting a kind of cover for the mold.

Water is preferably projected through the grating and onto the stones in two stages: a stage for washing per se by means of jets of water under pressure; followed by a stage for rinsing with a spray of droplets.

The installation for implementing the method and provided by the invention comprises a series of moving molds located one after the other on a running track, with the track passing through a series of successive stations in which the various block manufacturing stages are performed, with conveyor means being provided for transferring the molds from station to station.

In a preferred embodiment of the invention, each mold comprises two distinct parts suitable for being fixed to each other:

a top part in the form of a frame and having an inside shape which corresponds to the outline of the block; and a bottom part bearing the bottom grating and provided with wheels for running along said track.

When blocks in accordance with above-mentioned French patent FR No. 2 545 129 are to be manufactured, two opposite edges of the top portion are shaped as irregular lines which are complementary and interfittable in each other.

Advantageously, the cement compressing station in the installation comprises a carriage and a pressure plate movable relative to the carriage, said carriage being guided in translation parallel to the running track and being arranged to accompany a mold as it passes through the stages of cement compression and water projection, and means being provided to urge the pressure plate against the mold in order to compress the cement contained therein.

BRIEF DESCRIPTION OF THE DRAWINGS

An implementation of the invention is described by way of example with reference to the accompanying drawings, in which.

MORE DETAILED DESCRIPTION

Figure 1:
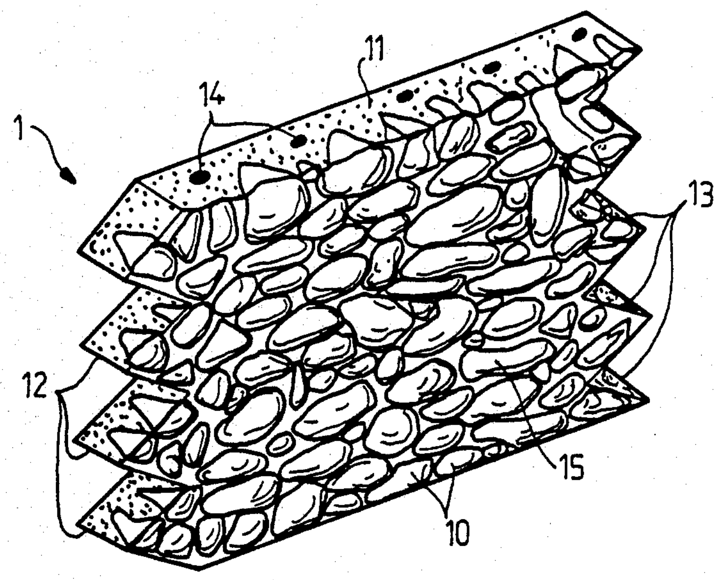
FIG. 1 is a perspective view of a building block manufactured by the method in accordance with the invention.

The building block 1 shown in FIG. 1 is a generally rectangular slab having the dimensions 50×25×8 cm. Opposite short sides 12 and 13 of this slab are zig-zag shaped. The block is essentially constituted by cement 11, but it is provided on one of its faces (15) with a layer of juxtaposed and practically joined visible stones 10 which are held in place by the cement.

The term "cement" is used to cover not only cement per se (a mixture of calcium carbonate and aluminum silicate), but also in general manner any hardenable binder capable of being used in building, e.g. concrete. A metal reinforcing member 14 such as a trellis of welded crossed iron bars, for example, is embedded in the cement.

The stones 10 may be rejects from cutting granite, or pebbles, or schists or shale, white stone from Touraine, etc. The sizes of the stones are selected as a function of local availability and/or the desired building style.

Blocks 1 are assembled to make a structure in a manner similar to that by which conventional blocks or slabs are assembled, using mortar, cement, or cement-glue. By interfitting the zig-zag edges of two contiguous plates during assembly, it is possible to mask the joins between the plates, thereby giving the structure the particularly pleasing appearance of a pile of dry stones.

This type of prefabricated block may be used for constructing various kinds of edifice or paving, in particular walls (including dry stone walls), fireplaces, barbecues, wells, steps, and paving in gardens or pedestrian areas.

Figure 2:
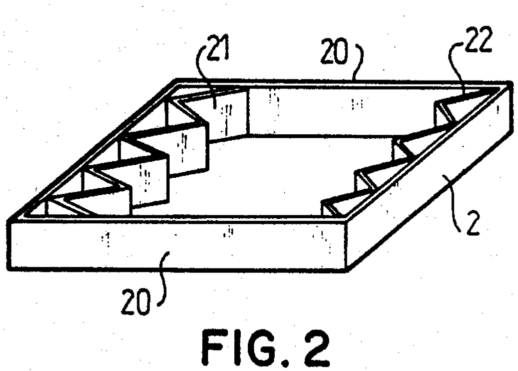
FIGS. 2 and 3 are diagrammatic perspective views of the top and bottom portions respectively of the mold.
Figure 3:
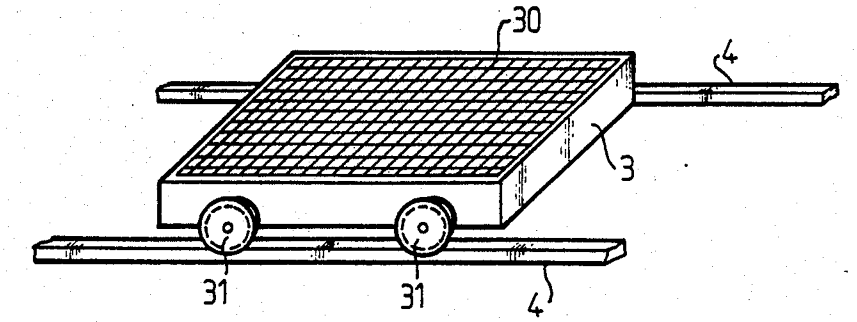

The mold shown in FIGS. 2 and 3 comprises a top portion 2 and a bottom portion 3.

The portion 2 is in the form of a frame having two opposite rectilinear sides 20 and two other sides 21 and 22 in the form of irregular lines, with the shape and size of the inside space delimited by these sides corresponding to the outline of the block 1 which is to be manufactured.

The bottom portion 3 is also in the form of a frame of size equal to or slightly greater than the size of the frame 2. The frame 3 supports a horizontal grating 30 constituted by two crossed series of parallel rods. The mold portion 3 is mounted on two pairs of idler wheels which are guided in translation on a pair of horizontal rails 4, with the portion 3 thus constituting a moving carriage.

Appropriate means readily designed and implemented by the person skilled in the art and therefore not shown for the sole purpose of simplifying the drawings, enable these two portions 2 and 3 to be fixed together once the frame 2 has been placed on the frame 3. These fixing means may be constituted by conventional types of clamping means, for example including a lever and/or a toggle, allowing the portion 2 to be locked quickly onto the portion 3 and to be unlocked rapidly therefrom.

Figures 4A, 4B, 4C, 4D, 4E, 4F:
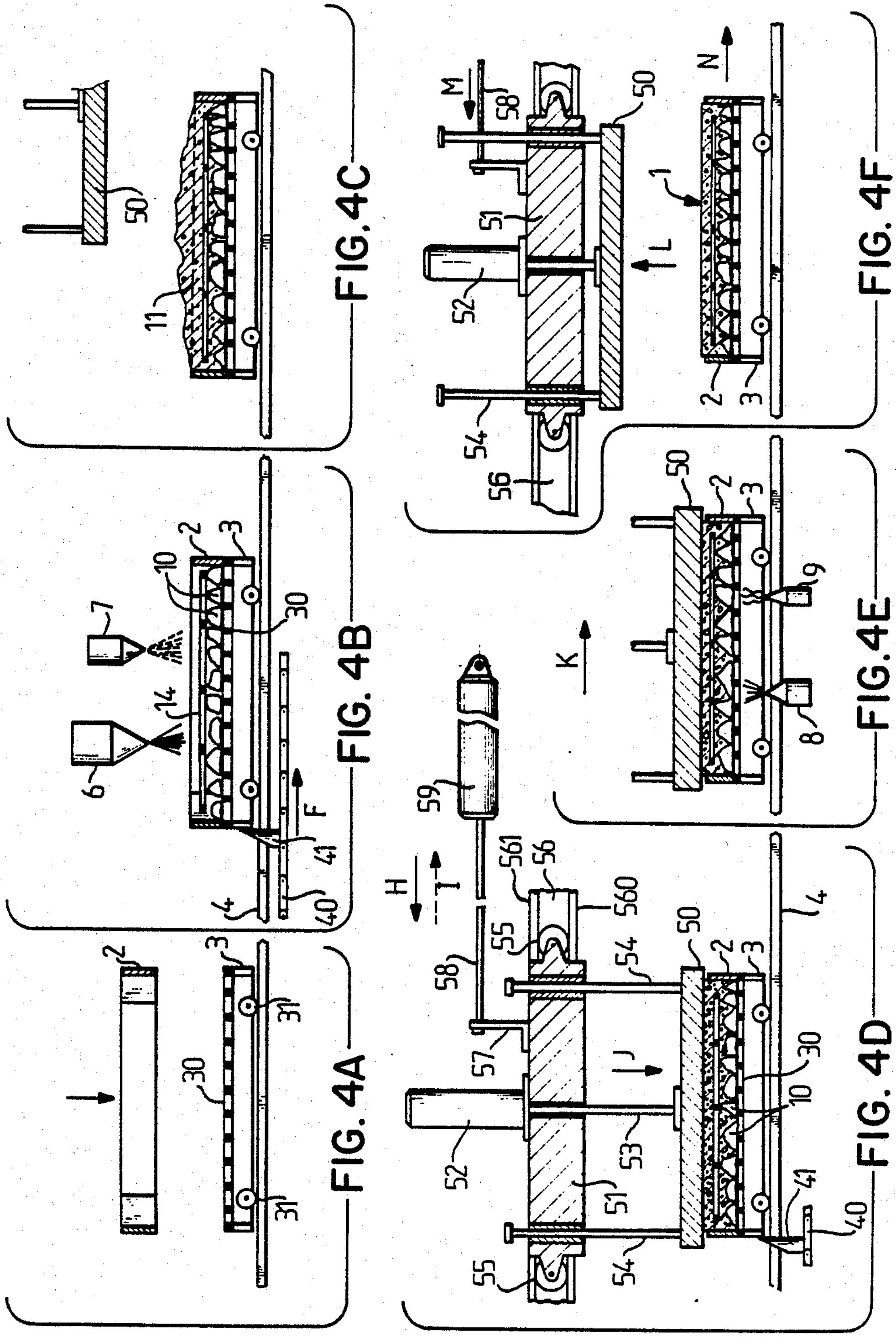
FIG. 4 is a diagrammatic view of the intallation for the purpose of showing the various stages in the method in accordance with the invention.

FIG. 4 shows how to proceed to manufacture a building block of the type shown in FIG. 1 using the above-described mold. This figure diagrammatically shows the various stations in an installation for implementing the method.

In FIG. 4, the bottom portion of the drawing should be considered as constituting an extension of the top portion, with the two portions being joined at reference B—B'.

The running track 4 for the carriage 3 runs through a set of stations in which the various stages for manufacturing the block 1 are performed. A plurality of identical moles 2–3 are provided suitable for running one after the other along the track 4, thereby avoiding slack periods in the various work stations.

A suitable conveyor such as a moving chain 40 having pusher lugs 41 (shown occasionally) serves to drive the molds through the installation from one work station to the next. The molds move from left to right in FIG. 4. They may move at a speed of about 0.1 meters per second (m/s) to 0.2 m/s, for example.

The installation includes a station (II) fitted with a washing device 6 and an additive spray device 7, both of which are located over the mold path. Both of the devices are provided with downwardly directed liquid projection nozzles.

The installation includes a station (IV) fitted with a cement compression device 5 located above the mold path. This device comprises a carriage 51 having wheels 55 guided in translation along a horizontal running track 56 extending parallel to the track 4. The track 56 comprises bottom and top rails 560 and 561 respectively, which positively engage the wheels 55 both upwardly and downwardly.

The device 5 also includes a pressure plate 50 mounted on the carriage 51 and movable in translation relative thereto in a vertical direction. Vertical columns 54 guide the plate 50 relative to the carriage 51 and a double-acting hydraulic ram 52 displaces the plate 50 via a rod 53.

The pressure plate 50 is a rectangular plate which is slightly larger in size than the frame 2.

A bracket 57 is fixed on the top of the carriage 51 and has the free end of a horizontal control rod 58 attached thereto. This rod forms part of a hydraulic or pneumatic single-acting actuator for positively displacing the carriage 51 in the opposite direction to the direction of mold travel (arrow H), and to avoid hindering displacement of said carriage when it is being moved in the same direction as a mold (arrow I) by the piston chamber being connected to atmospheric pressure.

A station (V) located immediately downstream from the station (IV) is fitted with a washing device 8 and with a rinsing device 9, these two devices being situated beneath the mold path and being provided with water projection nozzles which are upwardly directed.

The stroke of the actuator 59 is sufficient to allow the carriage 51 to pass to a position where it is immediately above the two devices 8 and 9.

Suitable control members (which may be manual or automatic) serve to switch on the projection devices 6, 7, 8, and 9 and the ram 52 and the actuator 59 synchronously with the passage of the molds through the installation.

A building block of the above-mentioned type is manufactured in this installation as follows:

An operator situated at the first station (referenced I) places the top portion 2 onto the bottom portion 3 of a mold, and fixes it in place by means of clamping means provided for the purpose.

Then, another operator places a layer of stones 10 on the grating 30 in the mold 2–3 prepared in this way and takes care to ensure that the stones are in contact with one another. The operator then optionally places a metal reinforcement member 14 on said layer either directly on said layer or else at a distance therefrom by virtue of appropriate spacer members.

The lug chain 40 drives the mold 2–3 so that it then passes to the station (II) beneath the devices 6 and 7 which respectively wash the stones 10 (and, where appropriate, the reinforcement member 14) by projecting water thereon, and then spray a coating on these items of a suitable additive of conventional type for improving cement adherence thereto.

On leaving the station (II), the top portion 2 of the mold is filled with fluid cement which covers the stones 10 and the reinforcing member 14 (station III). This filling operation may be performed manually by one or more operators or else automatically by means of a pouring hopper located over the mold path, or else in a semi-automatic manner.

The mold filled with cement then arrives at the compression station (IV) whose pressure plate 50 is lowered by extending the ram 52 so as to bear against the mass of cement 11 (arrow J). As a result the cement is put under pressure and is thereby forced to completely and uniformly fill the entire inside volume of the mold, with cement creeping downwardly between the stones 10 as far as the grating 30. During this compression operation, the plate 50 acts as a cover for the mold and shapes the inside face of the block 1.

By way of example, experience has shown that a pressure of about 5000 Pa is satisfactory for properly distributing normally fluid cement inside the mold.

The pressure force developed on the cement by the plate 50 and transmitted to the carriage 51 is absorbed by the top rails 561 of the running track 56 so as to prevent the carriage from rising.

While applying pressure thereto, the device 5 accompanies the mold as it moves in translation along the track 4 with the piston chamber of the actuator 59 being put under atmospheric pressure (arrow I). This assembly thus passes through station (V) (arrow K) where the visible portion of the stones 10 pressed against the grating 30 is washed and then rinsed by successive water jets at high and low pressure produced by the devices 8 and 9 respectively.

The washing jets remove any cement which has crept not only over the visible portions of the stones but also which is retained in the interstices between the stones all the way to the grating 30, which cement would otherwise remain visible in the finished product, thereby spoiling the dry stone appearance thereof. Such washing is preferably performed at an adjustable pressure so that the power of the jets can be adapted to the fluidity of the cement and to the sizes of the stones being used. For example, the pressure of the water jets may lie in the range 0.5 to $5\times10^5$ Pa.

Subsequent rinsing by the device 9 which uses water droplets serves to remove any cement splash marks that may remain after washing, or which may be caused by the washing itself.

The cement is then de-compressed by retracting the ram 52, thereby raising the plate 50 (arrow L, station VI)).

Simultaneously, the actuator 59 which had previously been retracted by the advancing carriage 51 (as driven by the mold 2–3) is extended, thereby returning the device 5 to station (IV) (arrow M). This device is then ready to act on the next mold.

The mold 2–3 is then sent (arrow N) to a storage and drying area (not shown) for example a drying carrousel where the cement sets. Once it has set, an operator unmolds the finished block 1. The extraction of an block from a mold is facilitated by the fact that the mold is in two portions, which portions are advantageously separated for un-molding purposes.

The running track 4 is preferbly a closed loop, thereby returning the empty mold 3–4 to the station (I) after unmolding, said empty mold then being ready to receive a new load.

Naturally, the present invention is not limited to the preferred implementation described above purely by way of example. On the contrary, the invention extends to any variant thereof.

Thus, it would be possible, for example, to increase the manufacturing throughput by mounting a plurality of molds on a single carriage passing through the installation, for example by having a group of four molds per carriage.

Further, molds are not necessarily fixed to their carriages but may simply be placed thereon.

The grating constituting the bottom of the mold is not necessarily constituted by crossed rods. The term "grating" covers any perforated plate suitable for retaining the stones and the cement in the mold while passing jets of washing water.

What is claimed is:

1. A method of manufacturing building block imitating a pile of dry stones, the block having a shape and including an outside face which is lined with visible juxtaposed stones held in place by cement, the method comprising the following stages:

(a) the stones are placed side-by-side on a bottom of a mold whose inside shape corresponds to the shape of the block, the bottom being constituted by a grating;

(b) the mold is filled with fluid cement;

(c) the cement is compressed in order to force it to be uniformly distributed within the mold and to creep between the stones;

(d) while the cement is kept under pressure, water is projected through the bottom grating against the outside face of the block so as to remove any cement to be found thereon;

(e) pressure is removed from the cement and it is allowed to set; and (f) the block is extracted from the mold.

2. A method according to claim 1, wherein prior to casting the cement, a metal reinforcement member is placed in the mold.

3. A method according to claim 1, wherein the cement is compressed by means of a moving pressure plate which moves parallel to the bottom of the mold in the form of the grating, the pressure plate constituting a cover for the mold.

4. A method according to claim 1, wherein the water is projected through the bottom grating in two stages:

a washing stage using jets under pressure; and a rinsing stage using a spray of droplets.

5. A method according to claim 1, wherein prior to casting the cement, the stones placed in the mold are washed.

6. A method according to claim 5, wherein after washing the stones placed in the mold, and prior to casting the cement, an additive is projected onto the stones for facilitating cement adherence.

* * * * *